March 16, 1943.     W. L. GARBERDING     2,314,271
AUTOMATIC DIE STOP STRUCTURE
Filed Jan. 28, 1942     2 Sheets-Sheet 1

Inventor
By Waldo L. Garberding
McCaleb, Wendt & Dickinson
Attorneys.

March 16, 1943.   W. L. GARBERDING   2,314,271
AUTOMATIC DIE STOP STRUCTURE
Filed Jan. 28, 1942   2 Sheets-Sheet 2
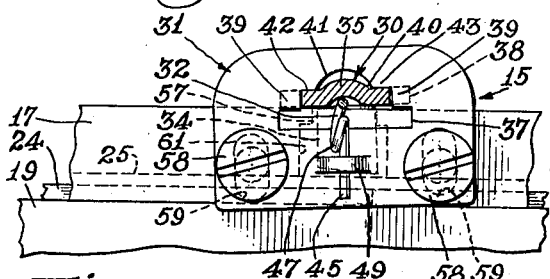
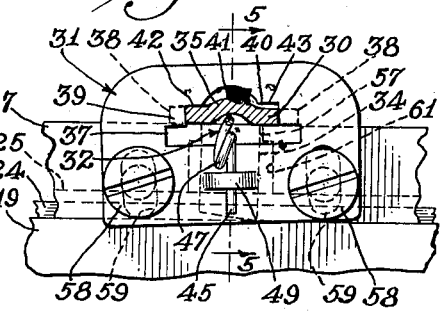
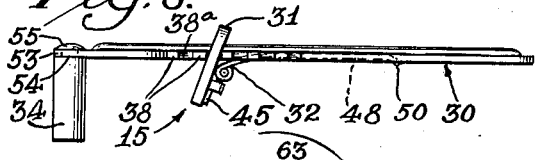
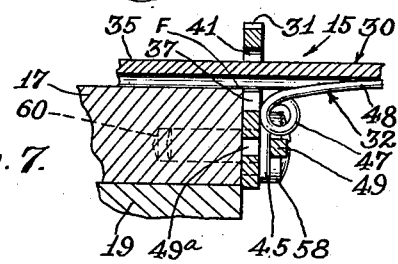
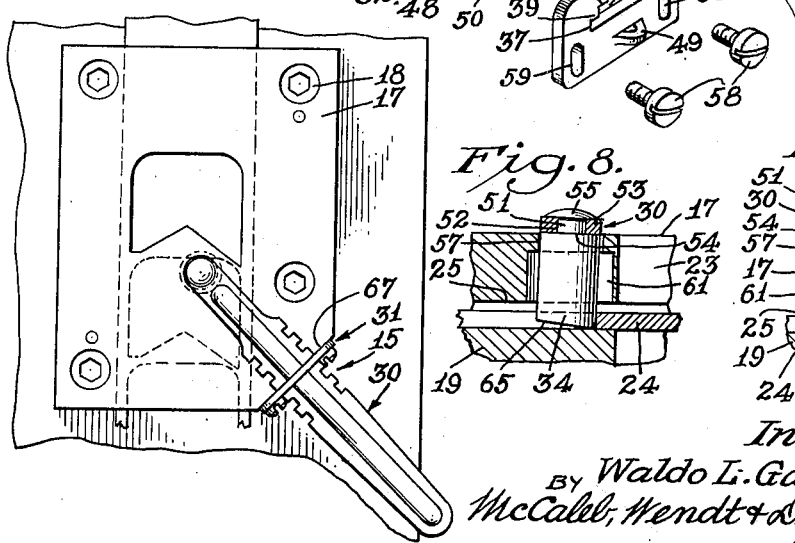
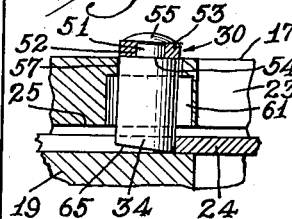
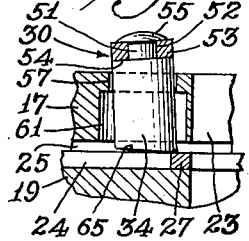
Inventor
Waldo L. Garberding
BY McCaleb, Wendt & Dickinson
Attorneys.

Patented Mar. 16, 1943

2,314,271

UNITED STATES PATENT OFFICE 2,314,271

AUTOMATIC DIE STOP STRUCTURE

Waldo L. Garberding, Chicago, Ill.

Application January 28, 1942, Serial No. 428,568

26 Claims. (Cl. 164—20)

This invention relates to automatic die stops and more particularly to preconstructed die stops adapted for use with progressive and compound dies.

Until relatively recently, it was necessary for the die-maker to make a separate automatic die stop for each die which required such a stop. This entailed considerable skill and labor and proportionately increased the cost of making dies.

Those preconstructed die stops which have heretofore come on the market have been too limited in application and unduly complex in construction. For one thing, they have required a plurality of different, and sometimes too delicate, springs without which they could not operate. All of them, in common with the individually made types of stop, have required one or more pivots between parts, such pivots being liable to wear out and become loose and sloppy, or even fail altogether, thus substantially limiting the usefulness of the stops. They have also necessitated specially shaped holes or slots in the stripper plate. In addition, they have required far too much head room, thereby wasting very substantial potentially useful lengths of the die punches.

Another serious problem with prior stops has been the ever present danger of the stop assembly or a part thereof coming off and falling under the punch, inevitably resulting in damage to the die structure, and requiring costly shut downs and expensive repairs.

My present invention has for an object to overcome the foregoing and other defects and deficiencies in automatic die stops generally, and to provide an automatic die stop which is highly adaptable to meet various conditions and requirements in use, is very efficient and reliable, and is of such simple construction that it can be manufactured by quantity production methods and sold at low cost.

Another important object of the invention is to provide a preconstructed automatic die stop which requires so little head room between the stripper plate and the punch mechanism that much more of the punch is available for productive use than has been possible with prior die stops.

The invention also has among its objects and advantages:

1. To provide a die stop assembly having substantially less parts than prior structures.

2. To provide a die stop which is easier to install, in less time than prior types.

3. To provide a die stop which is highly adaptable for meeting practically all requirements as to location on the stripper plate, and will function just as effectively at either the front or rear side or at a corner of the stripper plate.

4. To provide a die stop which, because of the novel manner of its mounting, enables the saving of a considerable amount of costly tool steel in the die.

5. To provide a die stop which embodies but a single spring which serves functions formerly requiring the use of a plurality of springs.

6. To provide a die stop which has an unusually large range of adjustability for different sizes of dies, so that one standardized form is adaptable for use with practically all dies with which such a stop can be used.

7. To avoid the use of pivots in the die stop.

8. To provide a die stop which can be used with complete safety, free from any danger of coming apart or interfering with the punch even if the stop assembly should become accidentally unfastened during operation of the press.

Other objects and advantages of the invention will be apparent from the following description and the accompanying drawings, in which similar characters of reference indicate similar parts throughout the several views.

Referring to the drawings, of which there are two sheets,

Fig. 3 is an enlarged fragmentary vertical sectional view taken substantially along the line 3—3 of Fig. 1 and showing the condition of the stop lever when it is in the released position in broken outline in Fig. 1;

Fig. 4 is a view like Fig. 3 but showing the relationship of parts when the stop lever is in the blank-stopping condition as shown in full outline in Fig. 1;

Fig. 5 is a transverse vertical sectional view taken substantially along the line 5—5 of Fig. 4;

Fig. 6 is a side elevational view of the lever-bracket unit prior to assembly with the stripper plate of the die;

Fig. 7 is a separated assembly view of the entire stop structure;

Fig. 8 is an enlarged fragmentary sectional detail view taken substantially along line 8—8 of Fig. 2;

Fig. 9 is a view like Fig. 8 but showing the stop pin in its released position; and Fig. 10 is a top plan view of the die stop showing how it can be used at one corner of the stripper plate.

Figure 1:
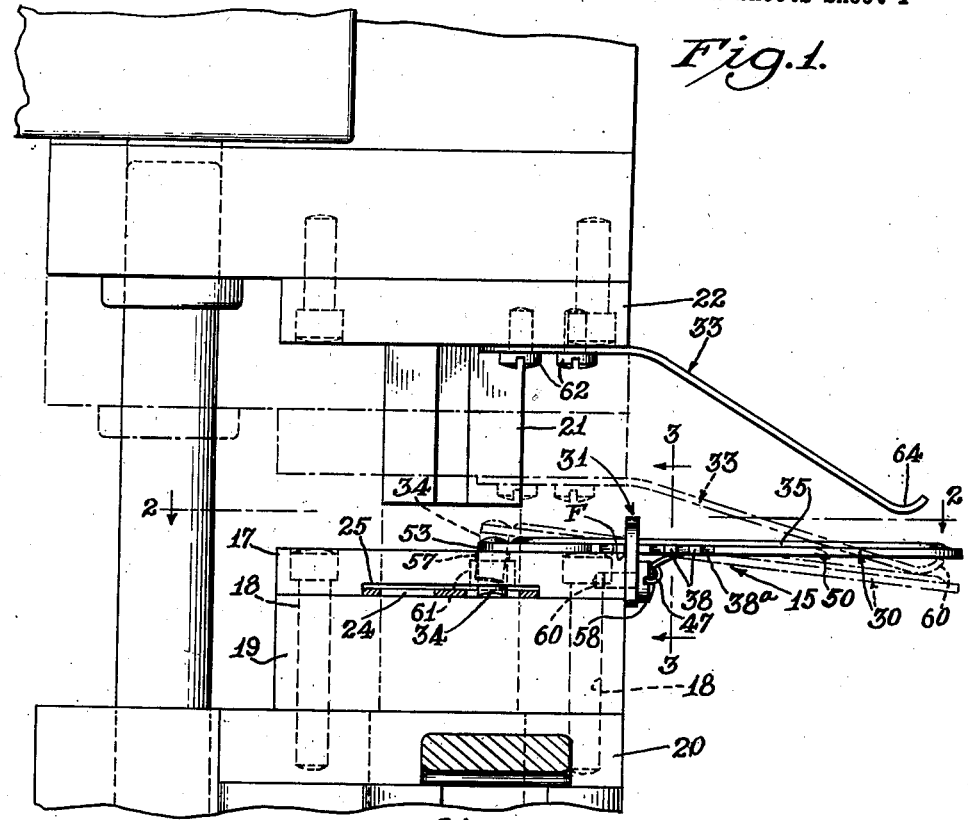
Fig. 1 is an end elevational view of a die structure and fragmentary portions of a punch press, and showing an automatic die stop embodying the principles of my invention.
Figure 2:
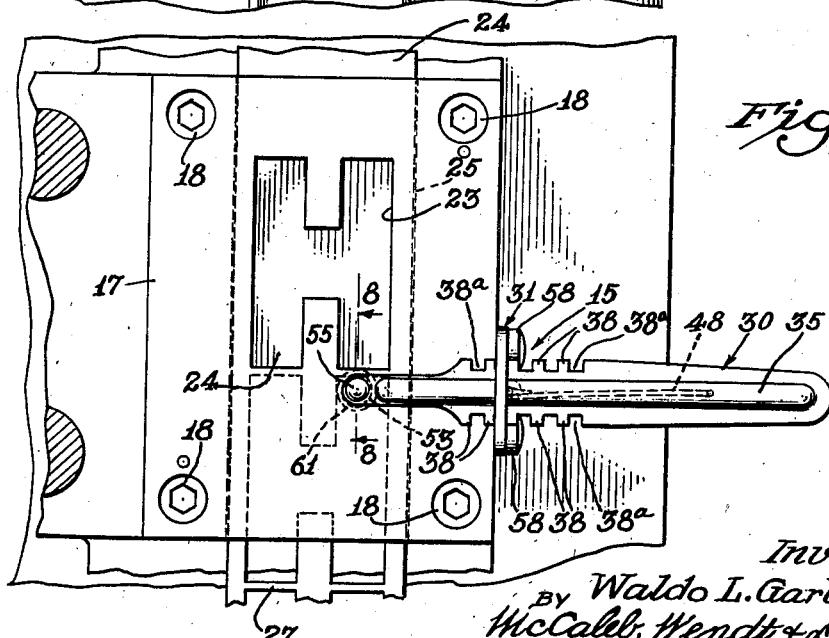
Fig. 2 is a top plan view of the die stop taken substantially in the plane of line 2—2 of Fig. 1.

A representative application of a die stop 15 embodying the features of my invention is shown in Figs. 1 and 2. In this instance, the stop is mounted upon the stripper plate 17 of a progressive die assembly. The stripper plate 17 is secured, by means including bolts 18, to a die block 19 which is carried by the lower shoe 20 of the die set. A punch 21 depending from a punch plate 22, secured in any preferred way to the ram of the punch press, works through a punch opening 23 in the stripper plate into the die plate 19. A strip of material 24, from which pieces are to be punched, is drawn through a channel 25 in the lower face of the stripper plate. The usual clearance scrap which remains in between blanks is identified by the numeral 27. The stop 15, of course, assures that the blanks will be properly spaced in the material 24.

An important feature of the stop 15 is its simplicity of construction. Thus, referring particularly to Fig. 7, the stop structure comprises simply an elongated flat stop-pin arm 30, a hinge bracket 31, a tension spring 32, and a trip 33. Adjacent one end, the arm 30 carries a perpendicularly extending, preferably separately formed, but permanently and rigidly secured, stop-pin 34. Less satisfactorily, the pin 34 may be made as an integral bent over end portion of the lever arm, but that requires thicker material and interposes other limitations upon construction and use of the device. All parts except the spring 32 and the pin 34 may be die-formed from suitable sheet metal. This sheet metal and the material from which the pin 34 is made may be of the least expensive variety practicable, such as cold rolled steel, which is then suitably hardened after the parts have been formed and the pin and arm have been assembled.

For convenience in handling and assembly, the arm 30 is adapted to be assembled as a unit with the hinge bracket 31 and the spring 32.

To this end, the arm 30 is formed as a relatively narrow, flat lever of substantial length which may be made of relatively thin material longitudinally reenforced by means of a uniformly narrow and relatively shallow, transversely arcuate, pressed rib 35. Substantial coplanar body portions of the arm 30 extend to each side and beyond the smoothly rounded merging ends of the rib 35.

The hinge bracket 31 comprises a flat, slightly elongated plate which has a longitudinally extending slot 37 therethrough of a length and width proportioned to receive the lever arm 30 endwise in freely slidable relation. The slot 37 is longitudinally centered in the plate but may be located slightly to one side of the transverse center of the plate so as to leave a wider body area on one side than the other side of the slot.

Interlocking means are provided for maintaining the lever arm 30 in a predetermined longitudinally adjusted position relative to the bracket plate 31. One interlock component is formed on the lever arm and comprises alined laterally projecting integral elements or fingers 38 formed by providing preferably square notches 38ª in the opposite longitudinal edges of the lever. The complementary interlock component on the bracket plate 31 comprises integral retaining lugs 39 formed at the ends of one side of the slot 37 by a lateral enlargement 40 of the slot dimensioned to receive fully the body of the lever intervening between the notches 38ª. Only enough clearance is allowed between the lugs 39 and the opposing inner end surfaces of the notches 38ª to permit free relative assembly movement and transverse rocking of the arm 30 without side play, while the clearance between the lugs and the opposing side surfaces of the fingers 38 is slightly greater to an extent permitting limited longitudinal rocking of the arm.

A cove-like clearance 41 is formed in the outer side of the enlargement 40 to receive the bulge of the rib 35. This insures against interference with full engagement of the outer faces of the solid areas of the lever arm body adjacent the inner ends of the notches 38 with respective shoulders 42 and 43 provided by the edge defining the enlargement 40 at each side of the clearance 41.

Through this arrangement, the lever arm 30 is adapted to be assembled with the bracket plate 31 by extending the arm through the slot 37 and relatively sliding the arm and bracket plate until the alined notches 38ª and the retaining lugs 39 are brought into registration. Then the lever is shifted transversely through the enlargement 40 until it engages the shoulders 42 and 43. In this position the lever will be held effectually against longitudinal displacement but is adapted to be rocked about both a longitudinal and a transverse axis.

In practice, thoroughly satisfactory results under all conditions have been obtained with two standard sizes of the automatic stop, one for use with dies working on materials from about .010" to $\frac{3}{32}$" thick, and a larger and heavier size for dies working on heavier materials ranging from about $\frac{3}{32}$" to $\frac{3}{16}$" in thickness. In the smaller size of the stop, the lever arm 30 has been made from material of about $\frac{1}{16}$" thickness, about 3¾" long by ½" wide. For this, the bracket plate 31 may be about an inch long and ⅝" wide and made of material approximately $\frac{3}{32}$" thick. All practical adjustments in the effective length of the stop-pin end portion of the lever arm 30 of the smaller size stop for various sizes of dies may be effected by having a plurality of preferably five sets of the retaining notches 38ª of about $\frac{3}{32}$" width equally spaced apart approximately $\frac{3}{32}$" by the fingers 38 in that extent of the lever arm 30 between its transverse center and the stop-pin tip. The larger size stop has been satisfactorily made with the lever arm 30 of $\frac{3}{32}$" material and the hinge bracket plate of ⅛" material, the arm being about 4¾" long and the bracket 1⅛" long, and other proportions correspondingly increased over the smaller size.

After assembly, the lever arm 30 and the bracket plate 31 may be handled as a unit and are held against separation by action of the tension spring 32. To this end, the spring 32 is formed from suitable spring or music wire (.037" for the smaller size and .047" for the larger size) and has a short anchoring leg 45 connected by means of an integral flat loop 47 to an angularly extending pressure leg 48 of substantial length. The anchoring leg 45 is adapted to be received within the eye of an integral anchoring loop or strap 49 struck out from the bracket plate at preferably the longitudinal and transverse center of the wider portion of the plate lying between the lever slot 37 and the farthest longitudinal edge of the plate. The strap 49 is narrower than the length of the anchoring leg 45, and leaves a slot 49ª

(Fig. 5) within the bracket plate. Thus, when the leg 45 is placed within the eye of the strap, with the spring loop 47 extending toward the lever arm slot 37, such leg will completely bridge and extend substantially beyond each side of the slot 49ᵃ. A substantial clearance is preferably maintained between the loop 47 and the adjacent center inner face of the rib 35. By driving the end portions of the anchoring strap 49 inwardly into the slot 49ᵃ, the eye portion of the strap is drawn tightly against the engaged portion of the spring leg 45 and holds it permanently in place on the bracket plate.

In the initially formed condition of the spring 32, the pressure leg 48 preferably extends at a substantially obtuse angle to the leg 45 so as to cause the spring to become loaded by flexure of the legs toward right angularity when the lever arm 30 is assembled with the bracket plate 31. The pressure leg 48 bears strongly against the outer or leverage end portion of the lever arm 30, cradled within the channel provided by the reenforcing rib 35. This relationship not only centers the pressure leg 48 longitudinally of the lever arm, but prevents it from being laterally displaced relative to the arm. At its free end portion, the pressure leg 48 is adapted to be bent away from the surface of the lever arm, as indicated at 50, to avoid interference with free relative sliding movement of the leg and arm when the lever arm is tiltably moved relative to the bracket plate 31.

It will thus be seen that the energy of the spring 32 directed against the lever arm 30 tends to drive the arm in a counterclockwise direction relative to the bracket plate 31 and toward the interlocked condition of these parts, as seen in Fig. 6. In the pre-mounted assembled relationship of the arm-bracket unit, the bracket plate 31 therefore assumes a position tilted toward the axis of the stop-pin 34 to the limit permitted by the play between the sides of the interlock fingers 38 and the interlock lugs 39. Adjustment of the bracket 31 longitudinally of the lever arm 30 can be effected easily, however, by forcing the lever arm against the action of the spring 32 out of the slot enlargement 40, and into the main portion of the slot 37 and relatively sliding the lever arm and bracket plate until the selected set of interlock notches 38ᵃ registers with and receives the interlock lugs 39.

The stop-pin 34 may be made in a screw machine from rod material of any preferred diameter. In practice ¼" diameter rod has been found generally satisfactory for the smaller size and ⁵⁄₁₆" diameter rod for the larger size of the stop, but other sizes may of course be used for special requirements. The initial length of the pin may be greater than will be required where even the thickest sort of stripper plate is used, so that the end of the pin can be ground down to the preferred length for any job.

Attachment of the pin 34 to the lever arm 30 is effected by forming the pin with a reduced diameter stem 51 (Fig. 7) which is preferably press fitted into a centered aperture 52 in a flat end area 53 of the arm. A shoulder 54 at the base of the stem and an upset head 55 on the end of the stem firmly clamp the intervening portion of the area 53. Thus, the stop-pin and the lever arm form a permanent rigid structure which has been found in practice to be quite enduring.

The width and radius of the arm area 53 are preferably the same as the diameter and radius of the pin 34 so that there will be no interference of the arm with the punch 21 when the pin extends through a hole 57 close to the punch opening 23 in the stripper plate 17. In fact, the pin hole 57 may be closer to the punch opening 23 than the width of the scrap clearance 27 of the material, where the latter is approximately equivalent to the thickness of the material 24. The reenforced portion of the lever arm 30 may be of a uniform width with the area 53 to the nearest set of interlock fingers 38.

In mounting the arm-bracket unit upon the stripper plate 17, the flat broad face of the bracket plate 31 opposing the stop-pin 34 is secured tightly against one edge of the stripper plate by means of a pair of screws 58 which extend through identical screw holes 59 adjacent the opposite ends of the bracket plate and are threaded into tapped bores 60 in the stripper plate (Figs. 1 and 5). The apertures 59 are preferably located in equi-distantly spaced relation from the respective opposite ends of the bracket plate 31 in alinement with the anchoring strap 49.

The screw holes 59 are elongated in a transverse direction relative to the bracket plate, but are of a width just sufficient to receive the threaded shanks of the screws 58 therethrough. Thus, when the screws 59 are loose the plate 31 can be shifted transversely of the stripper plate edge, but at no time can the plate move longitudinally to any appreciable extent.

In the working condition of the arm-bracket unit upon the stripper plate 17, the bracket plate 31 is fixedly secured in place in such a manner that the slot 37 is closed by the edge of the stripper plate and the lever arm 30 lies against the opposing face of the stripper plate. This forces the lever arm and the bracket to assume a substantially right angular relation as shown in Figs. 1 and 5, and places the spring 32 under substantial tension or load. The pin-carrying end of the lever is therefore constantly urged with considerable energy toward the stripper plate 17 to drive the stop-pin 34 forcefully through the hole 57 into stopping relation to the material 24.

Adjacent the outer face of the stripper plate, the stop-pin hole 57 is preferably of a diameter just slightly larger than the diameter of the stop-pin 34. Throughout its greater extent, however, the hole 57 is of substantially greater diameter than the stop-pin as indicated at 61 (Figs. 3 and 8). Through this arrangement the stop-pin 34 can be drawn out of the path of the material by rocking of the lever arm 30 about a fulcrum F (Fig. 5) provided by the engaged corner of the stripper plate, whereby to carry the pin-carrying end portion of the lever arm away from the stripper plate. However, the extent of such rocking movement will be limited by engagement of the pin with the inner smaller diameter wall portion of the stop-pin hole 57 due to the arcuate path that the pin must take as it is rocked away from the material, as shown in dot-dash outline in Fig. 1. The stop-pin 34 therefore never leaves the hole 57 during operation and may actually be limited to only a small clearance, as little as ₃₂", from the face of the material. Moreover, the closeness of the wall of the hole 57 to the pin limits the side play or swinging of the pin from transverse pressure thereagainst of the material 24 (Fig. 8), hence relieving the lever arm 30 from twisting strain and assuring constant accuracy in blanking. In a desirable practical relationship where the pin 34 is of ¼" diameter, the smaller diameter portion of the hole 57 should be of .257 inch diameter. A similar dimensional relationship is maintained where smaller or larger diameter pins are used. With the $\frac{5}{16}''$ pin the hole diameter is preferably .323" (drilled with a standard size P drill). The larger diameter hole portion 61 may be formed by redrilling to about $\frac{11}{32}''$ diameter, from the inside face of the stripper plate to about $\frac{1}{16}''$ from the outer face of the stripper plate for a ¼" pin; and ½" up to $\frac{3}{16}''$ from the top for a $\frac{5}{16}''$ pin. Although for the smaller diameter stop-pin 34 no filing is needed, it is recommended for best results that the hole 57 be filed slightly elongated, say $\frac{1}{32}''$, toward the inside of the stripper for the larger size.

Automatic tripping of the stop-pin 34 from the path of the material is effected by the trip member 33 which is preferably in the form of an elongated flat arm and is secured to the face of the punch plate 22 opposite the lever arm 30 as by means of a pair of screws 62 extending through spaced screw holes 63 adjacent to the inner end of the trip arm and removably threaded into the punch plate. The free end of the trip arm 33 is curvingly bent at a suitable angle toward the lever arm so that a curved heel 64 at the end of the arm will bear with substantially point contact against the opposing ridge of the reenforcing rib 35 adjacent the outer end of the lever arm 30 as an incident to each blanking stroke of the punch and thus rock the lever arm into the tripped position shown in dot-dash outline in Fig. 1. Although it is preferred to adjust the angle of the trip arm 33 so that it will as closely as practicable engage the lever arm 30 only sufficiently to produce the desired rocking action, any slightly more extended engagement will only cause the trip arm to yield resiliently after the limit of rocking movement, as determined by the interengagement of the pin 34 and the wall of the pin-hole 57, has been reached. The spring 32, of course, automatically returns the lever to stopping position when the trip arm releases the lever arm. As the punch 22 wears off or is ground off in sharpening, and the punching stroke correspondingly shortened, the trip arm 33 should also be readjusted.

As an incident to each tripping of the stop-pin 34, the end of the pin automatically swings contrariwise to the direction of movement of the material so as to overlap the face of the clearance scrap 27 (Fig. 9) and then engage the same following release of the lever arm 30 until the material 24 can be advanced following withdrawal of the punch. An overlap or bite of $\frac{1}{32}''$ has been found to be satisfactory.

This result is attained by an adjustment incident to mounting of the arm bracket unit which permits the lever arm 30 to have a side rocking action as well as the longitudinal rocking action. Thus, when the bracket plate 31 is secured in place, the end of the plate opposing the direction of travel of the material through the stripper plate is tilted up sufficiently so that the adjacent side of the lever may move to a limited extent toward or away from the opposed face of the stripper plate. The elongated form of the screw holes 59 allows for a substantial range of adjustment in this respect.

The action of the spring 32 urges the lever arm 30 up against the shoulders 42 and 43, thus causing the arm to assume the same transverse tilt as the adjusted tilt of the bracket plate 31 and correspondingly swinging the stop-pin 34 contrariwise to the direction of movement of the material 24 (Figs. 3 and 9). After the punching operation, the stop-pin 34 rides on the clearance scrap as seen in Fig. 9, and the material 24 may be shifted onward until the stop-pin snaps down from the clearance scrap and into the next blank where it is engaged by the advancing edge of the material. The force with which the material is drawn through the die causes it to swing the stop-pin 34 back into the stopping position and correspondingly rock the lever arm 30 in opposition to the action of the spring 32. In the instance illustrated in Figs. 3 and 4 this causes the side of the lever arm to leave the shoulder 43 and fulcrum on the shoulder 42 toward the opposing face of the stripper plate. Thereafter, when the stop-pin is tripped, the automatic side action of the lever under the influence of the spring 32 causes the stop-pin to jump out and over into overlapping relation to the newly formed scrap clearance 27. To facilitate gaining the overlap the tip of the pin 34 is preferably ground off slantingly toward the advancing edge of the material, as indicated at 65 (Figs. 8 and 9).

Frictional drag of the edge of the material on the stop-pin can be minimized by adjustment of the swinging range of the pin to permit the pin to assume a slightly forwardly tilted relation to the edge of the material in the stopping condition, thus reducing strain incident to tripping of the pin.

Although the side action of the lever arm 30 has been particularly described with respect to mounting of the stop assembly at the front edge of the stripper plate, identical results are obtained where the automatic stop is mounted at the rear edge of the stripper plate, except that in the latter instance the shoulder 42 will be tilted away from the stripper plate and the shoulder 43 will hold the adjacent side of the lever down and serve as the side action fulcrum.

At times it is distinctly advantageous to be able to mount the die stop 15 to extend in from one corner of the stripper plate 17 substantially as shown in Fig. 10. For this purpose, the corner of the stripper plate may be formed with a diagonal edge 67, for example of 45° angularity, to which the hinge bracket 31 of the die stop is attached similarly as has already been described for attachment to the front or rear edge of the stripper plate. The diagonal edge 67 could, of course, be formed at the other corner of the same end of the stripper plate if preferred. I have found that my die stop works equally as effectively under conditions demanding such a corner mounting as when mounted at the front or the rear edge of the stripper plate. The corner mounting is particularly advantageous where the form of the punch or other part of the die is such as to obstruct proper front or rear edge mounting. This capability is apparently unique with my automatic die stop.

From the foregoing it will be apparent that my preconstructed automatic die stop is of eminently efficient and reliable design, is constructed of a remarkably small number of relatively simple parts, and is unique in its adaptability for use, without alteration, in any practical position on the stripper plates of all types of compound or progressive dies. Mounting of this die stop is an amazingly easy matter, involving simply the drilling (and when preferred slightly filing) of the properly located stop-pin hole and drilling and tapping the fastening screw holes in the stripper plate of the die.

The only part of the stop structure that lies between the stripper plate and the punch plate is the tin lever arm, which in the smaller size of the stop may be no more than 3/32" thick inclusive of the reenforcing rib; and the total rocking clearance for the pin end of this lever need be no more than 1/8" (in the larger size about 7/32"). A very substantially greater portion of the punch length can therefore be used as compared with prior stops, thus materially increasing the life of the die.

The side mounting of the stop is also of distinct advantage in that it permits substantial savings in die block steel, and also stripper plate material, amounting in practice up to as much as 3/4" on each side of the die even with the smaller size stop, as compared to similar size prior die stops.

The use of but a single, practically indestructible spring, and the elimination of pivots in the stop assembly, assures maximum freedom from mechanical failure.

The novel manner in which my die stop may be adjusted for use with different sizes of dies permits it to be made in no more than two standard sizes suitable for practically all requirements.

This die stop also eliminates all danger of damage to the die should the stop accidentally become detached. In such event the stop may cease to function properly but cannot fall off and between the punch and the die. There are no parts that are likely to become accidentally detached from the stop.

The simplicity of construction and the many savings effected in the manufacture of the stop permit it to be made and sold at lower cost than has been possible with any prior stop of this class.

While I have illustrated a preferred embodiment of my invention, many modifications may be made without departing from the spirit of the invention, and I do not wish to be limited to the precise details of construction as set forth, but desire to avail myself of all changes within the scope of the appended claims.

Having thus described my invention, what I claim as new and desire to secure by Letters Patent of the United States is:

1. In combination in apparatus of the character described, a stripper plate having a stop-pin hole therethrough, a stop-pin extending through said hole for engagement with the advancing edge of material guided by the stripper plate, a supporting arm for said pin, means for rockably mounting said arm on said stripper plate, and means for rocking said arm to trip said stop-pin in coordination with the strokes of the associated die punch, the relationship of the pin and the wall defining said hole being such as to interengage for limiting the extent of tripping movement of the stop.

2. Apparatus substantially as defined in claim 1 in which only a small portion of the stop-pin hole adjacent the outer face of the stripper plate is engageable by the stop pin.

3. In combination in apparatus of the character described, a stripper plate for a die assembly, an automatic die stop cooperating with said stripper plate for defining the extent of advancing movement of material therethrough between each punching operation, said die stop including a lever arm fulcrumed directly upon said stripper plate, and means providing a second fulcrum permitting rocking of the arm in a different direction from that permitted by the direct fulcrum on the stripper plate.

4. In combination in apparatus of the character described, a stripper plate having a stop-pin hole therethrough, a stop-pin extending through said hole, an arm having one end portion supporting said pin for reciprocal movement into and out of stopping position, and means for retaining said arm in place, said means being fastened to an edge of the stripper plate in a position to clear any adjacent part of the punch structure of the associated die, the opposite end portion of said arm projecting beyond said retaining means and being engageable for actuating said arm to effect said reciprocal movement.

5. In an automatic die stop structure of the character described, a stop-pin, a lever arm supporting said stop-pin for projection through a stripper plate into the path of material to be stopped, and means for securing the lever arm in place on the stripper plate, said means and said lever arm being constructed and arranged for both longitudinal and transverse rocking movement of the lever arm.

6. An automatic die stop structure substantially as defined in claim 5 in which the securing means is adapted to be secured rigidly to the stripper plate, and the lever arm and the securing means have interlocking structure for retaining the lever arm against displacement relative to said securing means.

7. An automatic die stop substantially as defined in claim 5, in which the lever arm is in the form of a substantially flat sheet metal member, and said securing means is in the form of an apertured sheet metal plate having the arm extending therethrough.

8. As an article of manufacture, an automatic die stop pin, and a lever arm supporting said pin, said arm being of generally flat, elongated form and having the pin secured rigidly to one face of an end portion of the arm, the pin extending angularly to the flat plane of the arm.

9. A structure substantially as set forth in claim 8 in which the lever arm has a longitudinal reenforcing rib, and a return spring interengages with the rib for normally urging the arm into operative position.

10. A structure substantially as set forth in claim 8 in which the lever arm has integral means at its edge for cooperation with a retaining bracket structure.

11. In combination in an automatic die stop structure of the character described, a lever arm having a stop-pin adjacent to one end, a hinge bracket for mounting said lever rockably in position on a stripper plate, and means on said lever arm and on said bracket quick detachably interengageable for retaining the lever arm and the bracket in a predetermined assembled relationship.

12. In combination in an automatic die stop structure of the character described, a stop-pin, an elongated member carrying said stop-pin, a bracket for retaining said member in place on a stripper plate, and cooperating means on said member and said bracket enabling longitudinal adjustment of said member relative to said bracket.

13. An automatic die stop structure substantially as set forth in claim 12 in which the elongated member has a series of alined oppositely projecting elements, and the bracket has elements cooperating with said projecting elements for determining the relative adjusted condition of the elongated member and said retaining means in accordance with the selected projecting elements engaged.

14. An automatic die stop structure comprising, in combination, a stop-pin, a lever arm carrying said pin, a hinge bracket adapted to be secured to a stripper plate and having said lever arm rockably associated therewith, and resilient means carried by said bracket and engaging said lever arm for urging the latter constantly in one direction.

15. As an article of manufacture, an automatic die stop unit comprising, in combination, a lever arm and stop structure, a hinge bracket, said lever arm structure and bracket being slidably interengaged and having means for retaining the same interlocked against sliding separation, and resilient means for maintaining the interlocked condition of the lever arm structure and bracket and being yieldable by pressure applied transversely of the lever arm structure to permit release of the interlock and relative sliding movement of the lever arm structure and the hinge bracket.

16. A die stop unit substantially as defined in claim 15 in which the hinge bracket comprises a plate adapted to be secured to one edge of a stripper plate, and the resilient means comprises a spring carried by the bracket and bearing against the lever arm structure at a substantial distance from the interlock tending at all times to rock the lever arm structure in one direction about an axis at such interlock.

17. An automatic die stop construction comprising, in combination, a stop-pin, a lever arm carrying said stop-pin and comprising a generally flattened elongated body having a longitudinal reenforcing rib therein, a bracket plate having an aperture for slidably receiving said arm, interlocking means on said arm and said bracket plate, and a spring carried by said bracket plate having a leg slidably engaging in a channel provided by said reenforcing rib.

18. In combination in an automatic die stop structure, a stop-pin, a lever arm carrying said stop-pin, a bracket member adapted to be secured to a stripper plate and retaining said arm in place for both longitudinal and side rocking movement of the arm, and a single resilient element acting to control both rocking movements.

19. In an automatic die stop structure, a stop pin, a lever arm carrying said stop pin, and adapted to be mounted relative to a stripper in a position generally transverse to the direction of travel of stock, the movement of which under the stripper is to be controlled by the stop, and means for maintaining said arm in position relative to the stripper permitting rocking action of the arm on both longitudinal and transverse axes in the operation of the stop.

20. In an automatic die stop construction, a generally flat lever arm adapted to be mounted in an operative position generally transversely of the direction of movement of a strip of material, the movement of which while traveling under a stripper is to be controlled by incremental advances, stop pin means carried by one end portion of the arm and extending laterally of one of the flat faces of the arm, the opposite end portion of the lever being adapted to project beyond an edge of the stripper for engagement by a trip element on a movable portion of the associated die assembly, and means for retaining the arm in place with at least a portion of said flat face resting in relatively movable relation upon the surface of the stripper.

21. An automatic die stop construction comprising, in combination, a stripper plate having a stop-pin hole therethrough, a stop pin extending through said hole for engagement with the advancing edge of material to be worked upon in the associated die, a supporting arm for said pin, means for rockably mounting the arm on the stripper plate, and means for rocking the arm on a horizontally transverse axis to trip the stop pin in coordination with the strokes of the associated die punch, the diameter of the wall defining said stop-pin hole being such for a limited extent adjacent to the point where the pin joins the arm as to interengage with the pin for limiting the extent of tripping movement of the stop, and throughout its remaining extent being of a substantially greater diameter so as to permit free side play of the pin.

22. In combination in an automatic die stop unit, a generally flattened and elongated sheet metal lever arm having a longitudinal reenforcing rib pressed therein and defining a channel along one face of the arm, a stop pin fixedly secured to said face adjacent one end of the lever on the axis of said rib, the opposite side edges of an intermediate portion of the arm having series of alined notches therein, a bracket plate for mounting the arm upon a stripper plate, said plate having an aperture therethrough comprising two portions one of which is dimensioned to permit free longitudinal passage of the lever arm therethrough and the other of which is dimensioned to receive the lever arm at the notches, and a spring mounted upon the bracket and having an arm engaging within said channel to maintain a normal interengagement of the arm ad the bracket at a selected position of longitudinal adjustment of the arm as determined by the selected alined notches.

23. In combination in an automatic die stop for use in controlling the advance of a strip of metal through a blanking die assembly including a stripper plate, a lever arm carrying a stop element, a bracket for mounting the lever arm operatively upon the stripper plate, a return spring operatively engaging the arm, the inter-relationship of the arm and the bracket being such that when mounted the arm is adapted to have a fulcrum for trip rocking upon a transverse horizontal axis directly upon a corner of the stripper plate, a fulcrum provided by the bracket for spring and strip induced rocking of the arm upon a longitudinal axis, the extent and direction of longitudinal axis rocking being selectively determinable by adjustment of the bracket relative to the stripper plate, and means for securing the bracket member to the stripper plate in various positions of relative adjustment.

24. An automatic die stop as defined in claim 23 in which the bracket comprises a flat plate having an aperture therethrough fashioned to receive the lever arm and providing the longitudinal axis rocking fulcrum, and the securing means comprises a pair of vertically elongated screw holes in the bracket plate and screws adapted to extend through the screw holes and threadedly engage within the vertical edge face of the stripper plate adjacent to the corner fulcrum, the relationship of the screw holes and screws being such that the bracket plate can be firmly secured in minutely incremental selective positions of vertical adjustment.

25. In combination in an automatic die stop structure, a rockable lever arm including a stop element, a mounting member assembled with the arm, and a return spring formed from a single strand of spring wire comprising a relatively short anchoring leg secured to said mounting member and a relatively longer angularly extending pressure leg joined to the short leg by an integral flat spring loop arranged to be placed under tension as the legs are moved toward one another from the normal angular relationship, said pressure leg operatively engaging the lever arm slidably.

26. An automatic stop as defined in claim 25 in which the mounting member comprises a bracket plate including an integrally struck out anchoring strap in engagement with the anchoring leg of the spring, and the adjacent face of the lever arm has a channel within which the pressure leg of the spring is cradled for relative sliding action.

WALDO L. GARBERDING.